United States Patent [19]

Shah et al.

[11] Patent Number: 5,030,871
[45] Date of Patent: Jul. 9, 1991

[54] REDUCING HARMONIC LOSSES IN DYNAMOELECTRIC MACHINE ROTORS

[75] Inventors: Manoj R. Shah, Latham; True T. Shih, Schenectady, both of N.Y.

[73] Assignee: General Electric Company, Schenectady, N.Y.

[21] Appl. No.: 522,037

[22] Filed: May 11, 1990

[51] Int. Cl.⁵ .................. H02K 3/487; H02K 5/02
[52] U.S. Cl. ........................... 310/261; 310/214
[58] Field of Search .................. 310/61, 214, 261

[56] References Cited

U.S. PATENT DOCUMENTS

| | | | |
|---|---|---|---|
| 3,324,324 | 6/1967 | Richardson et al. | 310/214 |
| 3,866,070 | 2/1975 | Madsen | 310/214 |
| 4,843,271 | 6/1989 | Shah | 310/156 |
| 4,900,964 | 2/1990 | Ying et al. | 310/214 |

FOREIGN PATENT DOCUMENTS

| | | | |
|---|---|---|---|
| 327519 | 1/1916 | Fed. Rep. of Germany | 310/214 |
| 313830 | 8/1916 | Fed. Rep. of Germany | 310/214 |
| 2049487 | 3/1971 | France | 310/214 |

Primary Examiner—Steven L. Stephan
Assistant Examiner—D. L. Rebsch
Attorney, Agent, or Firm—Nixon & Vanderhye

[57] ABSTRACT

A solid rotor for a dynamoelectric machine including field conductors and ventilation passages in axial slots is provided with low resistivity thermally conductive axial winged inserts which seal and overlie the slots to form a low resistivity cylinder about the rotor to minimize power losses and associated heating due to harmonic induced eddy currents, enhance the conductive cooling of the rotor, and increase efficiency.

15 Claims, 2 Drawing Sheets

REDUCING HARMONIC LOSSES IN DYNAMOELECTRIC MACHINE ROTORS

BACKGROUND OF THE INVENTION

This invention was made with United States Government support under a contract with the United States Navy. The United States Government has certain rights to this invention.

The present invention relates to dynamoelectric machines and, more particularly to the reduction of harmonic losses in alternating current (ac) dynamoelectric machines.

Dynamoelectric machines may be either motors or generators. In order to be specific, and by way of example, the present invention is described as applied to a round rotor ac synchronous motor. However, the following description and the present invention are equally applicable to a round rotor ac synchronous generator as well as other types of rotating electric machines.

A conventional round rotor ac synchronous motor commonly utilizes a solid magnetic steel forged rotor. The field windings are inserted into longitudinal slots which extend axially along the rotor and are provided with a direct current (dc) energizing current to produce magnetic poles and a magnetic field in the rotor. The rotor is rotatably mounted within the stator which is typically formed from a stack of laminated magnetic metal sheets which are insulated from one another. The stator includes windings energized by ac currents which produce a rotating magnetic field. The interaction of the rotating magnetic field in the stator with the magnetic field produced in the rotor causes the rotation of the rotor in a manner well known in the art.

Some types of ac motors control the motor from a dc source, or from an ac source having a frequency which is different from the frequency required by the motor for the desired speed, or vary the frequency supplied to the motor in order to control the speed of the motor while driving the motor from a constant frequency ac source. Common methods of providing the required input power to such motors include the use of a load commutated inverter or a cycloconverter. One form of current source inverter and one form of cycloconverter suitable for use with the present invention are described in U.S. Pat. No. 4,843,271 issued Jun. 27, 1989 to M. R. Shah, assigned to the same assignee as the present invention, and hereby incorporated by reference. That patent points out that the use of a current source inverter or a cycloconverter produce harmonics having relatively high frequencies which in turn produce eddy current in the surface of the rotor of the motor. The eddy current consumes power and reduces the efficiency of the motor, while at the same time providing unwanted heating of the motor. The power loss and heating are significant because of the relatively high electrical resistivity of the rotor steel. Public concern over pollution caused by the generation of electric power, and over the consumption of energy resources in the generation of electric power, has provided an increased and continuing demand for higher efficiency electric motors and generators. In the aforesaid U.S. Pat. No. 4,843,271 these undesirable characteristics are decreased by a coating of a high-conductivity metal covering a portion of over 10% of the surface of the rotor, and in one embodiment surfaces of dove-tail inserts which retain the rotor conductors in the longitudinal slots are coated with copper. The present invention constitutes an improvement over the aforesaid U.S. Pat. No. 4,843,271 as described below.

OBJECTS AND SUMMARY OF INVENTION

One object of the present invention is to increase the efficiency of ac motors or generators, while at the same time improving the inserts which retain the conductors in slots in the rotor.

Another object of the present invention is to minimize the losses in ac motors or generators due to eddy current produced by harmonics in the rotor.

Yet another object of the present invention is to reduce the cooling requirements for ac motors or generators.

With the aforesaid objects in view, these and other objects of the present invention are achieved by use of inserts to seal and overlie the ends of the conductor and ventilation slots on a rotor assembly to form a substantially cylindrical low resistivity enclosure about the rotor of the motor. The inserts are substantially I-shaped in cross section with circumferential winged projections which overlie and extend beyond the circumferential ends of the slots such that the winged projections are substantially contiguous. The winged projections are connected through the central portion of the inserts to the locking portion which includes sloped surfaces and base extensions, which mate with sloping surfaces and grooves in the walls of the slots, to engage and lock the inserts in place and resist radial movement of the conductors due to centrifugal forces upon rotation of the rotor.

The inserts are constructed of low electrical resistivity, thermally conductive material such as copper or copper alloys to conduct heat to the outside surface of the rotor assembly where the winged projections provide a large cooling surface. In addition, the low resistivity surface of the inserts minimizes high frequency induced eddy current power dissipation and heat generation, thus further increasing the power efficiency of the motor through decreased power losses and decreased heating, while at the same time providing improved cooling.

Figure 2:
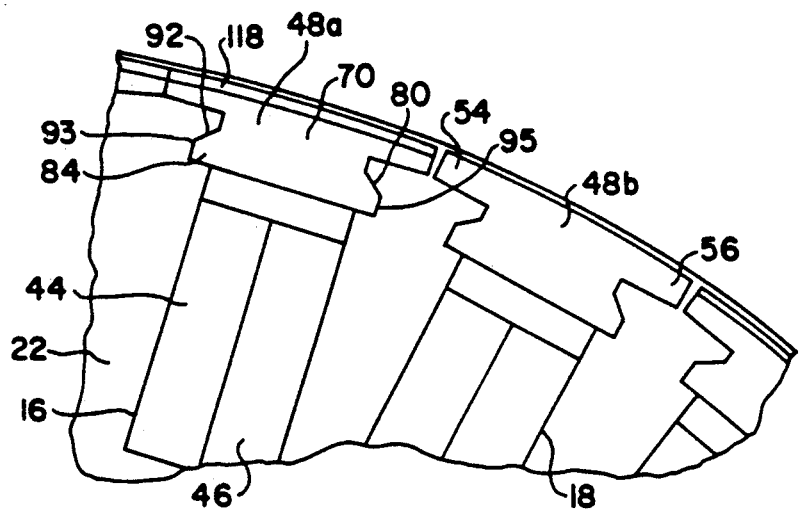
FIG. 2 is an enlarged view of a portion of FIG. 1.
Figure 1:
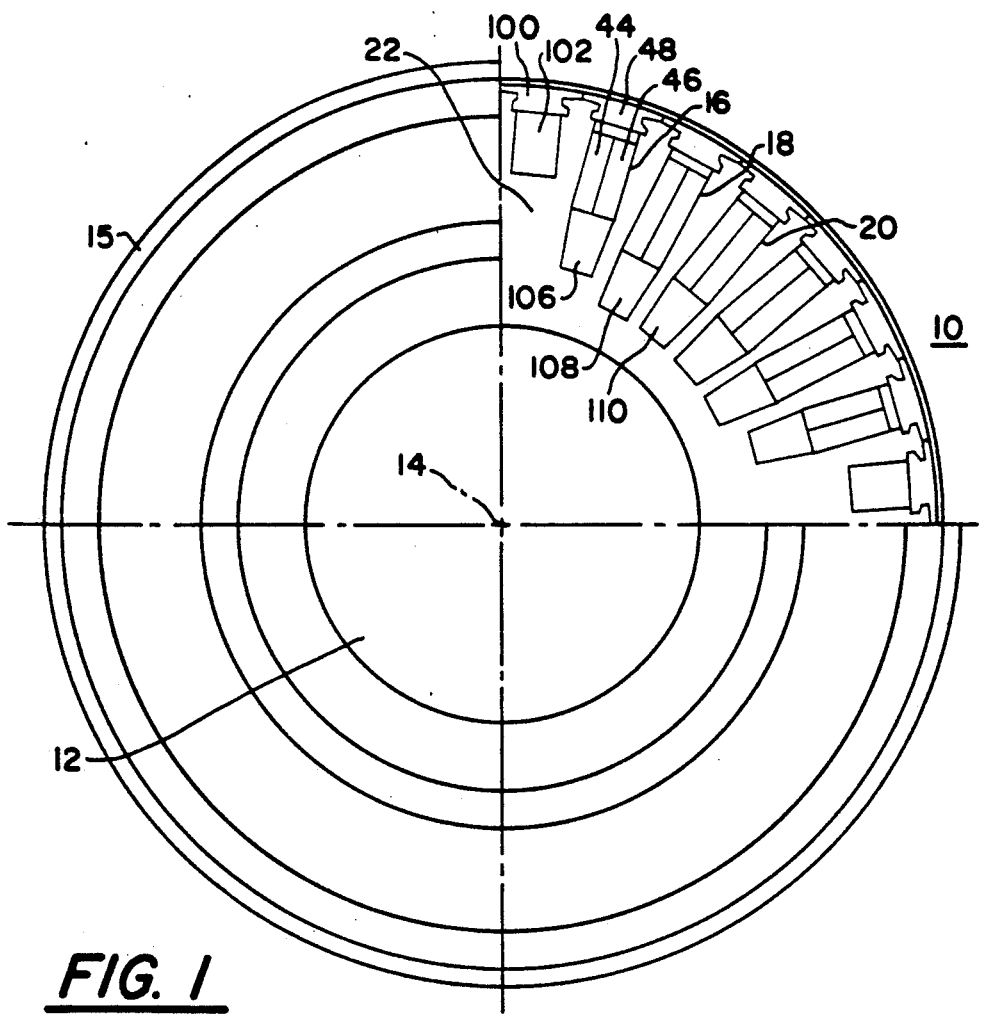
FIG. 1 is a cross section of a rotor assembly incorporating one embodiment of the present invention.
Figure 3:
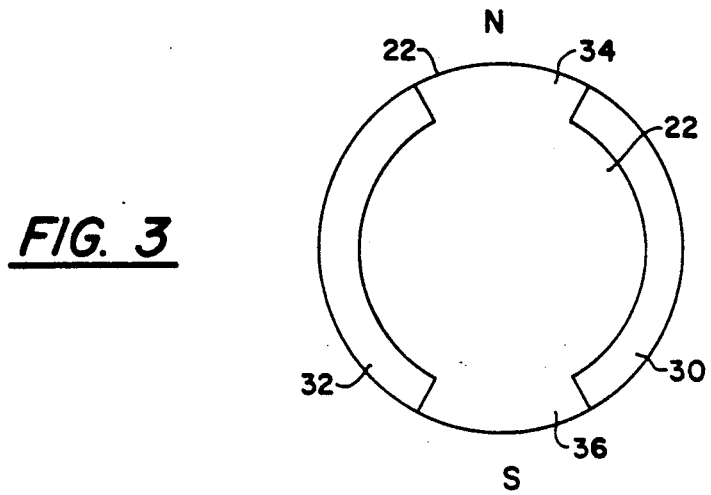
FIG. 3 is a cross section in schematic form showing the location of the conductor and pole regions of the rotor in a two pole machine.
Figure 4:
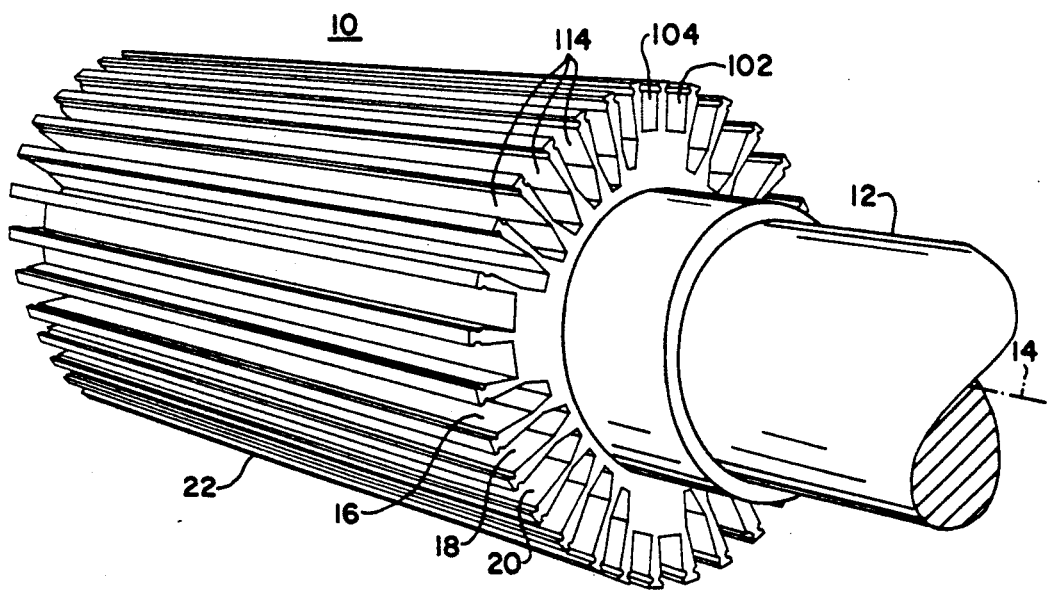
FIG. 4 is a perspective view of the rotor.

Referring first to FIGS. 1, 2 and 4, the solid steel forged rotor 10 includes a shaft 12 which extends axially outward from the ends of the central region 22 of the rotor. The shaft 12 is rotatably supported (not shown) about the axis of rotation 14 and includes a retaining ring 15. Conductor or field slots such as 16, 18, and 20 extend axially along the central region 22 of the rotor 10. As best shown in FIG. 3, the central region 22 includes two diametrically opposed conductor regions 30 and 32, and two pole regions 34 and 36 which are between the conductor regions, and are shown as a north and a south pole respectively. Conductor slots such as 16, 18, and 20 in the conductor regions 30 and 32 each include a plurality of conductors such as 44 and 46 disposed within the slots, and inserts such as 48 are secured to the central region 22 of the rotor 10 along the outer periphery of the slots in order to retain the conductors such as 44 and 46 in place during high speed operation of the motor. That is, the inserts 48 prevent the centrifugal forces of rotor rotation from forcing the conductors outward from the slots and away from axis of rotation 14.

Figure 5:
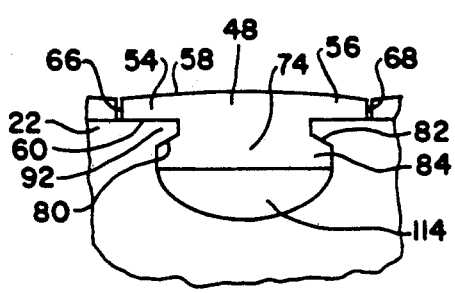
FIG. 5 is an alternate embodiment of the present invention showing improved cooling means.

The configuration of the inserts 48 can best be understood with reference to FIGS. 2 and 5. Referring to FIGS. 2 and 5, the inserts 48 (including inserts 48a and 48b) each include a pair of winged projections 54 and 56 which overlie the outer surface of the central region 22 of the rotor 101, and which are formed by a circumferential surface 58 and an inner surface 60 joined by edges 66 and 68. The central portion 70 of insert 48 connects the winged projections 54 and 56 to the extension or locking portion 84 through the outwardly sloping surfaces 80 and 82. Shoulders such as 92 (see FIG. 5) formed along conductor slots such as 16, 18 and 20 within the central region 22 of rotor 10 match the contour of the central portion 70, including sloping surfaces 80 and 82 of inserts 48 to retain the inserts in place after they are slid axially into the central region of the rotor after the placement of conductors 44 and 46 in the conductor slots. The grooves 93 and 95 extend axially along the conductor slots such as 16, 18, 20 and 106 and conform to, and surround, the base extensions 84 of the inserts 48.

The inserts 48 are fabricated of copper, or of a copper alloy, of low electrical resistivity and sufficient mechanical strength. If the strength requirement for the inserts 48 is higher than that obtainable through the use of copper or a copper alloy, a copper cladded steel insert may be used, with the copper cladding provided by explosive bonding, electroplating or by some other process.

In one embodiment, the inserts 48 illustrated in FIGS. 1, 2, and 5 have a circumferential surface 58 of 2.28 inches, a central portion 70 width of 1.01 inches, an extension 84 width of 1.47 inches, and an angle of 40 degrees from the radial direction for the outwardly sloping surfaces 80 and 82. The height of the inserts 48 in the radial direction from the axis of rotation 14 is 105 inches, the radial thickness of the extension 84 is 0.34 inches, and the edges 66 and 68 are 0.10 inches. In that embodiment of the subject invention, the angle do not extend radially beyond the retaining ring 15 as shown in FIG. 1, but rather, are surrounded thereby between adjacent axial conductor slots such as 16 and 18, and 18 and 20, is 8.2 degrees, and the depth of the conductor slots such as 16, 18 and 20 from the circumferential surface 58 is 7.44 inches to the bottom, which may be rounded. The depth of axial ventilation slot 102 is 1.04 inches. Of course, the size of the inserts 48 will vary depending on the size of the rotor and other design considerations.

In order to increase the low resistivity surface coverage of rotor 10 to over 90%, so as to minimize power losses due to the harmonic induced eddy current and to enhance thermal conductivity and cooling, inserts such as 100 (see FIG. 1) are also incorporated axially along the pole regions 34 and 36 (see FIG. 3). These inserts do not retain conductors but are provided, in part, to complete the low resistivity enclosure and path around substantially all of the circumference of the rotor 10 in the field coil region formed by the conductors such as 46 and 48. The axial conductor slots such as 16, 18 and 20 also form conductor ventilation passages such as 106, 108 and 110 axially through the central region 22 of rotor 10, below the conductors 44 and 46.

The ventilation slots such as 102 and 104 in the pole regions 34 and 36, and the conductor ventilation slots such as 106, 108, and 110 in the conductor regions 30 and 32, provide passages for the axial flow of cooling air through the rotor. In addition to guiding the cooling air flow through the axial ventilation slots such as 102, 104, 106, 108 and 110, the copper or copper clad inserts 48 and 100 provide improved thermal conduction paths to conduct rotor heat from inside to outside the rotor 10, and then into the air flow between the rotor and its surrounding stator caused by rotation of the rotor 10 past the stator. This greatly enhances the rotor 10 cooling capability of the motor. In addition, increasing the low resistivity copper (or copper alloy or other low resistivity material such as copper cladded steel); coverage of the rotor to the order of about 99% provides rotor resistivity to eddy current which is more than an order of magnitude lower than that of a typical forged steel rotor. Even with the same level of induced eddy current, the power losses are significantly reduced. Since power losses and the amount of heat generated in the rotor are directly related to resistivity, the power losses and heat generated are significantly reduced with a reduction in the eddy current. A reduction in the heat generated further reduces the amount of power input required to provide the larger amount of cooling air or fluid which otherwise would have to be provided through the ventilation slots such as 102, 104, 106, 108, and 110.

It has been estimated that the power loss caused by eddy current due to harmonics could be in excess of 50 kilowatts per square meter or 30 to 35 watts per square inch. In large motors this would provide significant power losses and also undesirable or unacceptably high temperatures on the surface of rotor 10 and within the motor.

FIG. 5 also illustrates an alternate embodiment for the axial ventilation slots in the pole regions 34 and 36. Referring to FIG. 5, it is seen that the portion of the axial ventilation slot 114 below the insert 48 is substantially semi-circular in cross section, while the cross section of the insert which is taken radially about the axis of rotation 14 of the rotor assembly 10 is substantially I-shaped. The semi-circular portion of the slot facilitates the fabrication of the slot.

High strength, high conductivity coppers or copper alloys which are suitable in some applications for the inserts 48 are chromium copper and zirconium copper. It is to be noted that in FIG. 2 the insert 48a differs from insert 48b in that insert 48a includes a copper coating or layer 118 on the circumference, while the remainder of the insert is steel to provide increased strength. In practice, the size, speed and other operating characteristics of a particular machine determine whether the inserts 48 are fabricated of copper, copper alloy, or copper cladded steel. Also, in a particular application and motor, all inserts would normally be the same, to satisfy the specifications and requirements of that motor and the application. The copper coating 118 could be applied by electroplating, explosive bonding or by some other process. Explosive bonding is a procedure which provides "cold welding" in that the insert 48a is driven "explosively" into the layer 118 to be "welded" or bonded to the layer. The thickness required in the coating or layer 118 depends in part on the frequencies of the harmonics to which the particular rotor assembly 10 is subjected. As the harmonic frequency increases, the depth to which the induced eddy current penetrates is reduced. Also, the thickness of the copper coating 118 should be adequate to conduct the magnitude of the eddy current to which the rotor 10 is subjected. Thicknesses in the order of 50 to about 250 thousandths of an inch appear to be satisfactory for most motors. The aforesaid U.S. Pat. No. 4,843,271 provides a high conductivity coating for dovetail wedges covering at least ten percent of the surface area of the rotor through coating at least some of the dovetail wedges.

Thus, the improved winged inserts 48 and rotor 10 construction of the present invention enables and provides low resistivity eddy current paths over substantially all of the rotor, to over 90 percent, and improves the cooling air flow, which significantly improves the efficiency, and lowers the cooling requirements for the motor. In addition, the winged inserts provide improved rotor heat conductivity and hence heat dissipation at the exterior of the rotor assembly 10, and the slot and insert configuration facilitate manufacture and assembly of the rotor.

While the present invention has been described as applied to a motor, it is equally applicable to generators. In addition, while the present invention has been described with respect to certain preferred embodiments thereof, it is to be understood that numerous variations in the details of construction, the arrangement and combination of parts, and type of materials used may be made without departing from the spirit and scope of the invention.

What we claim is:

1. A rotor assembly for a dynamoelectric machine comprising:
   a substantially solid steel rotor including a substantially cylindrical central region adapted to rotate about an axis of rotation;
   conductor slots extending axially along the circumference of said central region forming at least two conductor regions separated by at least two pole regions;
   field conductors disposed within said conductor slots and adapted to be energized to provide magnetic poles in said pole regions;
   a plurality of ventilation slots extending axially along the circumference of said pole regions;
   said conductor slots and said ventilation slots having substantially parallel edges extending axially along the circumference of said substantially cylindrical central region;
   inserts retained in said conductor slots and said ventilation slots;
   at least the surface of said inserts being of low resistivity material as compared with the resistivity of said steel rotor;
   said inserts including a central portion connecting winged projections and base extensions;
   said winged projections overlying said edges of said conductor slots and said ventilation slots being closely adjacent one another to thereby form a substantially cylindrical low resistivity insert surface around said central region of said rotor; and
   slots in said rotor mating with said base extension to restrain said inserts from radial movement toward the circumference of said rotor.

2. A rotor for a dynamoelectric machine of claim 1 wherein said base extensions are connected to said central portion through surfaces which extend toward said central portion and slope inwardly, and said conductor slots and said ventilation slots include cooperating sloping surfaces which restrain said inserts from radial movement away from the axis of said rotor.

3. A rotor for a dynamoelectric machine of claim 2 wherein at least some of said ventilation slots extending axially along the circumference of said pole regions are adapted to enable the flow of cooling fluid therethrough.

4. A rotor for a dynamoelectric machine of claim 3 wherein each of said winged projections include a curved surface remote from said axis of rotation to provide a peripherally extending arc of said substantially cylindrical insert surface.

5. A rotor for a dynamoelectric machine of claim 1 wherein said substantially cylindrical insert surface overlies in excess of 90 percent of the circumference of said rotor.

6. A rotor for a dynamoelectric machine of claim 1 wherein the radial depth of said ventilation slots extending axially along the circumference of said pole regions is less than the radial depth of said conductor slots, and form ventilation passages in cooperation with said inserts.

7. A rotor for a dynamoelectric machine of claim 1 wherein said inserts are high strength copper alloys having a lower resistivity and higher thermal conductivity than said substantially solid steel rotor.

8. A rotor for a dynamoelectric machine of claim 1 wherein said inserts include a cross section in the radial direction about said axis of rotation which is approximately I-shaped.

9. A rotor for a dynamoelectric machine of claim 8 wherein said conductor slots and ventilation slots include grooves extending axially and substantially parallel to the surface of said rotor forming a substantially T-shaped cross-section to restrain said inserts within said grooves.

10. A rotor for a dynamoelectric machine of claim 9 wherein said base extensions of said inserts form base surfaces which are smaller than the surfaces of said winged projections which are remote from said base surfaces.

11. A rotor for a dynamoelectric machine of claim 10 wherein said base surfaces of said inserts are substantially planar, and said conductor slots and said ventilation slots include sloping surfaces which restrain said inserts from radial movement upon rotation of the dynamoeletric machine.

12. A rotor for a dynamoelectric machine of claim 1 wherein at least one retaining ring surrounds the circumference of said substantially cylindrical insert surface.

13. A rotor for a dynamoelectric machine of claim 12 wherein said inserts are highly thermally conductive compared to said rotor to conduct rotor heat to said substantially cylindrical insert surface for cooling of said rotor assembly.

14. A rotor for a dynamoelectric machine of claim 13 wherein said inserts are a copper alloy.

15. A rotor for a dynamoelectric machine of claim 1 wherein the inner regions of said ventilation slots remote from said edges are rounded and in cooperation with said base extensions of said inserts form substantially semi-circular cross section passages for the flow of cooling fluid.

* * * * *